US012630371B2

(12) United States Patent
DeGroot et al.

(10) Patent No.: US 12,630,371 B2
(45) Date of Patent: May 19, 2026

(54) SPLIT SPROCKET

(71) Applicant: Laitram, L.L.C., Harahan, LA (US)

(72) Inventors: Michael Hendrik DeGroot, Rockford, MI (US); Peter Hilkhuijsen, Enschede (NL); Martin Sprenkeler, Enschede (NL); Gerko Hulshof, Aalten (NL)

(73) Assignee: Laitram, L.L.C., Harahan, LA (US)

( * ) Notice: Subject to any disclaimer, the term of this patent is extended or adjusted under 35 U.S.C. 154(b) by 63 days.

(21) Appl. No.: 18/712,337

(22) PCT Filed: Nov. 29, 2022

(86) PCT No.: PCT/US2022/051151
§ 371 (c)(1),
(2) Date: May 22, 2024

(87) PCT Pub. No.: WO2023/101927
PCT Pub. Date: Jun. 8, 2023

(65) Prior Publication Data
US 2025/0011097 A1    Jan. 9, 2025

Related U.S. Application Data

(60) Provisional application No. 63/285,153, filed on Dec. 2, 2021.

(51) Int. Cl.
*B65G 23/06* (2006.01)
*F16H 55/12* (2006.01)
(52) U.S. Cl.
CPC ............. *B65G 23/06* (2013.01); *F16H 55/12* (2013.01)

(58) Field of Classification Search
CPC ................................ B65G 23/06; F16H 55/12
USPC .................................... 198/834, 835; 474/95
See application file for complete search history.

(56) References Cited

U.S. PATENT DOCUMENTS

| | | | | |
|---|---|---|---|---|
| 5,037,356 A | * | 8/1991 | Gladczak ................ | F16H 55/12 474/902 |
| 5,295,917 A | * | 3/1994 | Hannum ................. | F16H 55/12 474/95 |
| 5,316,522 A | * | 5/1994 | Carbone ................. | F16H 55/12 474/903 |
| 5,469,958 A | * | 11/1995 | Gruettner ............... | B65G 23/06 474/903 |
| 5,511,893 A | | 4/1996 | Kilgus et al. | |
| 5,810,686 A | * | 9/1998 | de Jong ................. | F16H 55/46 474/96 |
| 6,146,299 A | * | 11/2000 | Harvey ................... | F16H 55/46 474/95 |
| 9,751,697 B2 | | 9/2017 | Ma | |
| 11,130,638 B2 | * | 9/2021 | Westergaard Andersen ................ B65G 39/02 | |
| 11,402,008 B2 | * | 8/2022 | Wu ......................... | F16H 55/12 |
| 2007/0161443 A1 | * | 7/2007 | Krisl ....................... | F16H 55/30 474/95 |
| 2014/0144754 A1 | | 5/2014 | Miller et al. | |

* cited by examiner

*Primary Examiner* — James R Bidwell
(74) *Attorney, Agent, or Firm* — Catherine M. Bishop

(57) ABSTRACT

A split sprocket for conveyor belts or chains comprises a first section and a second section that mates with the first section to form a sprocket with drive teeth distributed about the periphery and a central hub for retaining a shaft. The second section is inserted into a space in the first section and rotated into an engaged position to form a complete sprocket.

16 Claims, 18 Drawing Sheets

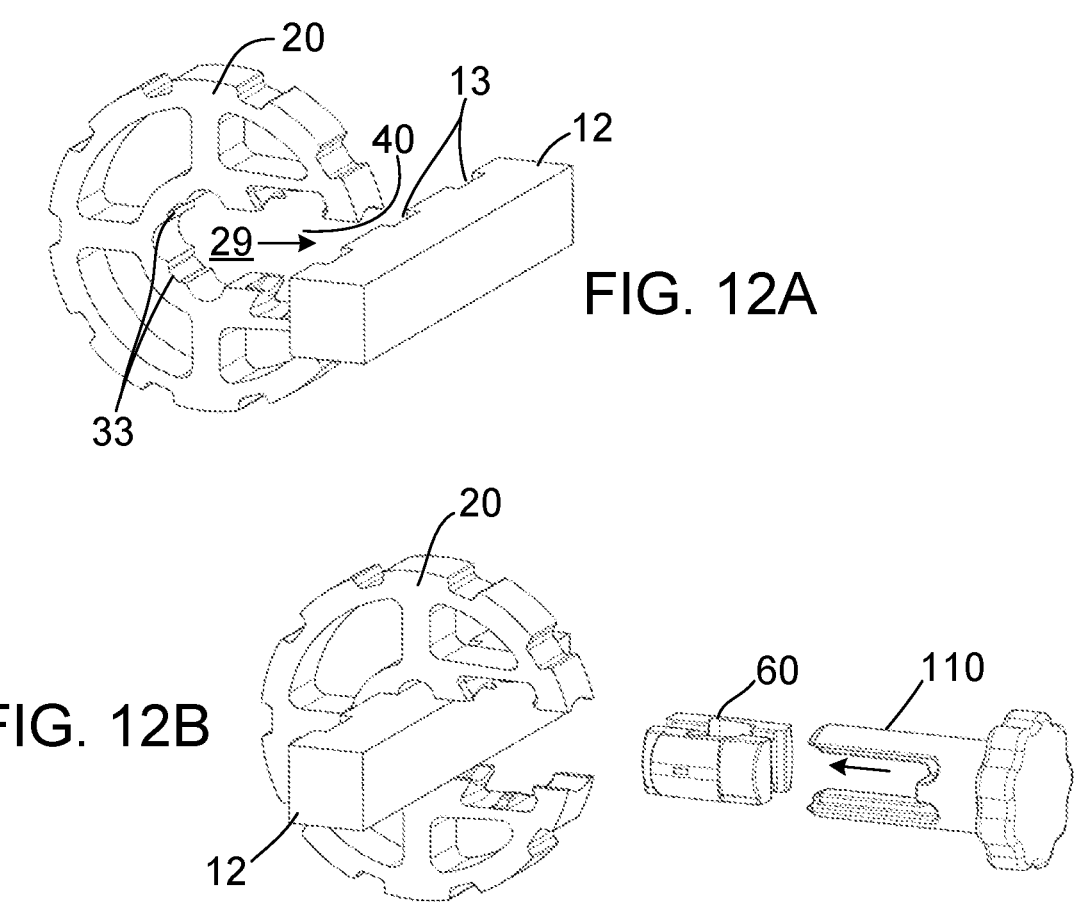
FIG. 12A
FIG. 12B
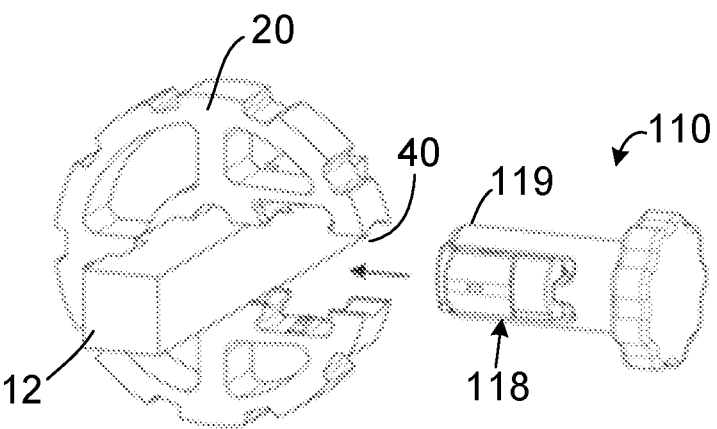
FIG. 12C

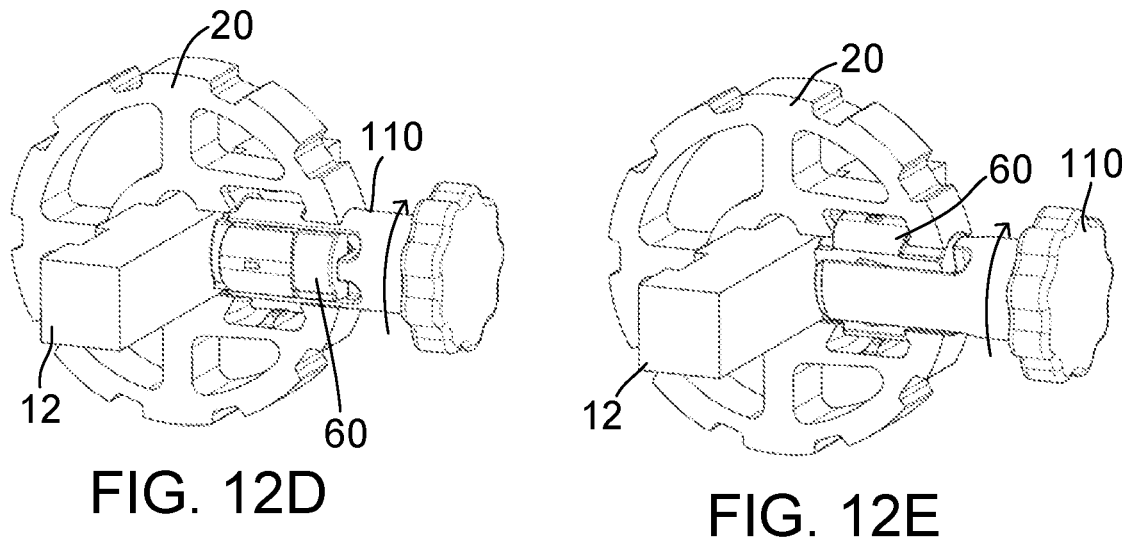
FIG. 12D
FIG. 12E
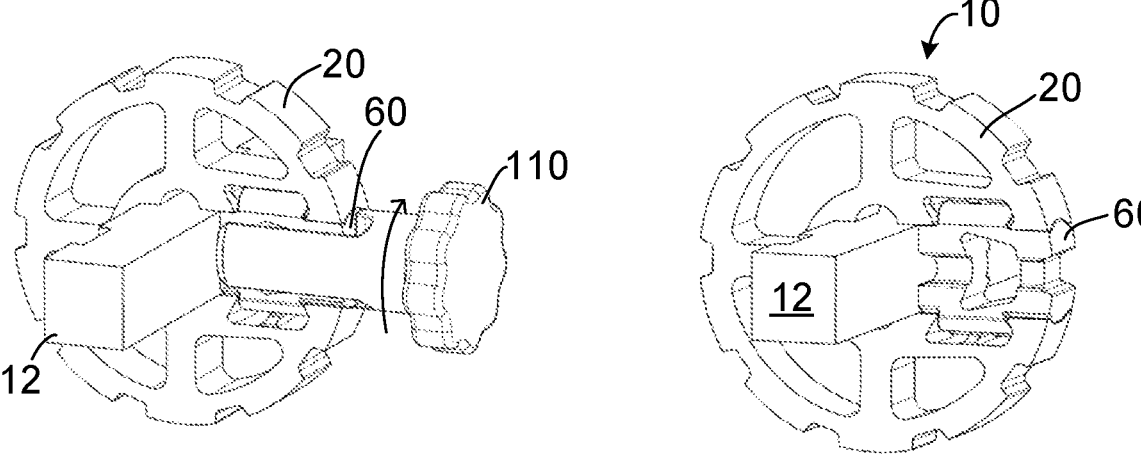
FIG. 12F
FIG. 12G

220

284

260

280

281

283

260

283

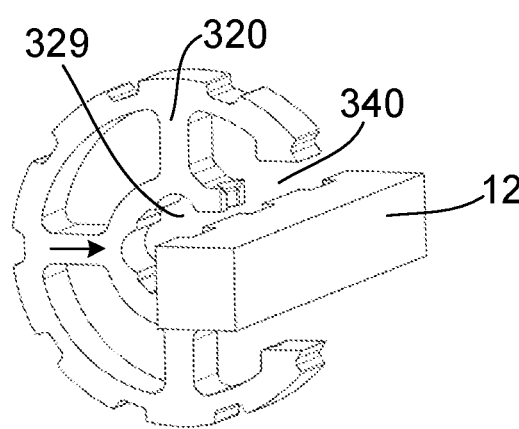
FIG. 31A
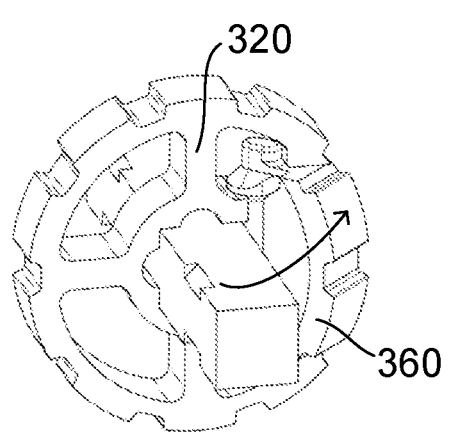
FIG. 31B
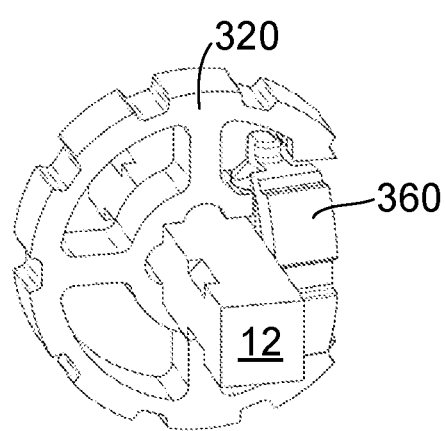
FIG. 31C
FIG. 31D
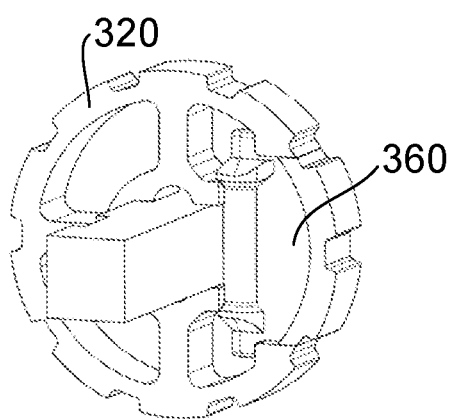
FIG. 31E

SPLIT SPROCKET

RELATED APPLICATIONS

The present application claims priority to U.S. Provisional Patent Application No. 63/285,153, filed Dec. 2, 2021 and entitled "Split Sprocket", the contents of which are herein incorporated by reference.

BACKGROUND

The invention relates generally to split sprockets that can be assembled on a drive shaft in an endless conveyor belt system.

Sprockets are used to drive endless power-transmission and conveyor belts and chains. Each sprocket is mounted on a shaft received by a bore extending axially through the sprocket. The shaft is supported at both ends by bearing blocks. A gearbox or a belt-driven pulley mounted to an end of the shaft makes the shaft a driveshaft. Installing a one-piece sprocket on a driveshaft requires that at least one bearing block be removed to slide the sprocket axially onto the shaft. Typically, the shaft also has to be lifted out of the conveyor side frame.

Split sprockets that are split along seams through their bores can be installed on shafts without removing bearing blocks. A first piece of the split sprocket is positioned on the shaft. Then, a complementary second piece is mated to the first piece. The two pieces are fastened to each other, usually by a pair of bolts or screws. One version of a split sprocket used with conveyor belts has two identical halves that fit together with mating puzzle-piece structure. Screws through the puzzle-piece structure at both seams tighten the pieces together. But the two screws do not provide much resistance to axial shifting of one sprocket half relative to the other. In addition, the need for tools to assemble the sprockets complicates assembly and disassembly and also presents potential cleanliness issues, potentially inhibiting hygiene.

SUMMARY

One version of a split sprocket embodying features of the invention comprises first and second sprocket sections that mate to form a sprocket with drive teeth distributed about the periphery thereof. A central hub in the sprocket retains a shaft. The first section includes an open peripheral portion and an open hub connected to the open peripheral portion. The second section forms a cap to close the peripheral portion and open hub. The second section in inserted into a space formed by the first section in a first orientation and rotated into a second orientation to mate with the first section to form a complete sprocket.

According to one aspect, a sprocket for a conveyor belt comprises a first sprocket section having a curved peripheral portion defining driving elements, a hub radially inward of the peripheral portion for receiving a shaft and a shaped passageway extending from a space in the curved peripheral portion to the hub. A second sprocket section is inserted in the shaped passageway to complete the peripheral portion and hub. The second sprocket section is configured to be inserted in the shaped passageway in a first orientation, then rotated to a locked position completing the peripheral portion and hub.

According to another aspect, a sprocket assembly, comprises a shaft and a sprocket. The shaft extends along a longitudinal axis and includes notches in a mounting region and the sprocket is sprocket mounted on the shaft in the mounting region. The sprocket comprises a first sprocket section having a curved peripheral portion defining driving elements, a hub radially inward of the peripheral portion for receiving the shaft and including bearing surfaces that interface with the notches and a shaped passageway extending from a space in the curved peripheral portion to the hub. A second sprocket section is inserted in the shaped passageway to complete the peripheral portion and hub. The second sprocket section is configured to be inserted in the shaped passageway in a first orientation, then rotated to a locked position completing the peripheral portion and hub.

According to another aspect, a section of a sprocket for a conveyor belt comprises a curved peripheral portion defining driving elements, a hub radially inward of the peripheral portion for receiving a shaft and a shaped passageway extending from a space in the curved peripheral portion to the hub for receiving another section of the sprocket to form a complete sprocket. The shaped passageway comprises a first curved, concave surface extending inwards from the curved peripheral portion, a second curved, concave surface opposing the first curved, concave surface extending inwards from the curved peripheral portion, a first recess extending tangentially in a central portion of the shaped passageway, a second recess opposing the first recess and extending tangentially in the central portion of the shaped passageway, a third curved, concave surface inwards of the first recess parallel to the first curved, concave surface and a fourth curved, concave surface opposing the third curved, concave surface and parallel to the second curved, concave surface.

BRIEF DESCRIPTION OF THE DRAWINGS

FIGS. 12A-12G illustrate a process of mounting and assembling the split sprocket of FIG. 1 according to an embodiment of the invention;

FIGS. 31A-31E illustrate a process of mounting and assembling the split sprocket of FIG. 26 according to an embodiment of the invention;

DETAILED DESCRIPTION

A split sprocket for driving or otherwise engaging a conveyor belt comprises multiple portions that mate together about a rotatable shaft. The invention will be described below relative to certain illustrative embodiments, though the invention is not limited to the illustrative embodiments.

Figure 1:
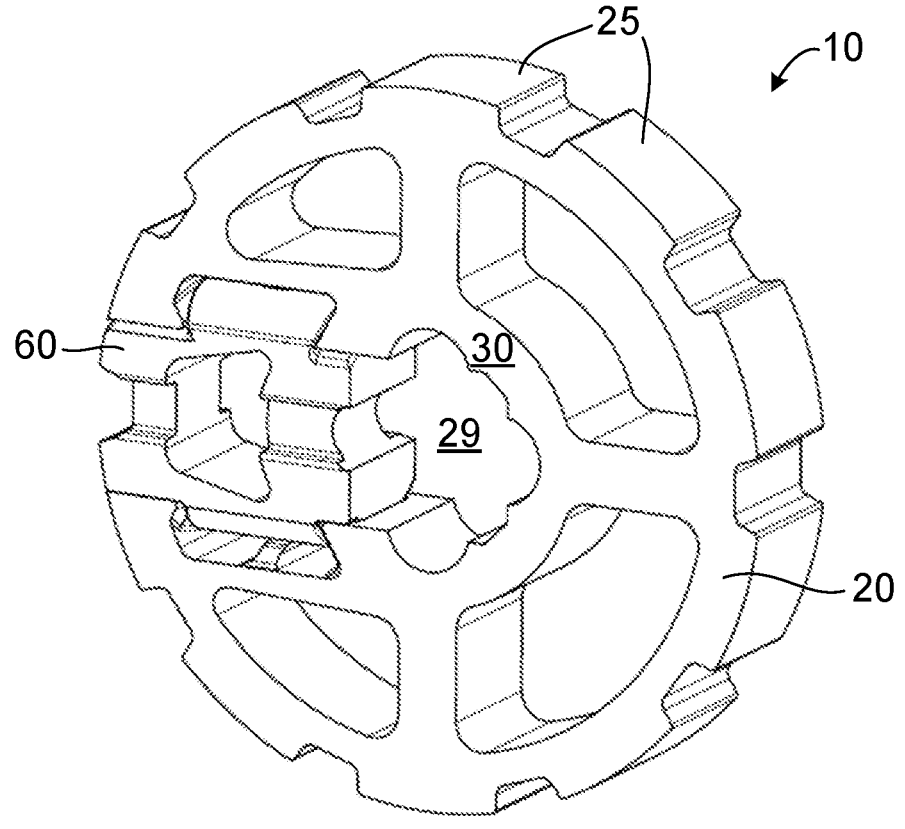
FIG. 1 is an isometric view of an assembled split sprocket according to an embodiment of the invention.
Figure 2:
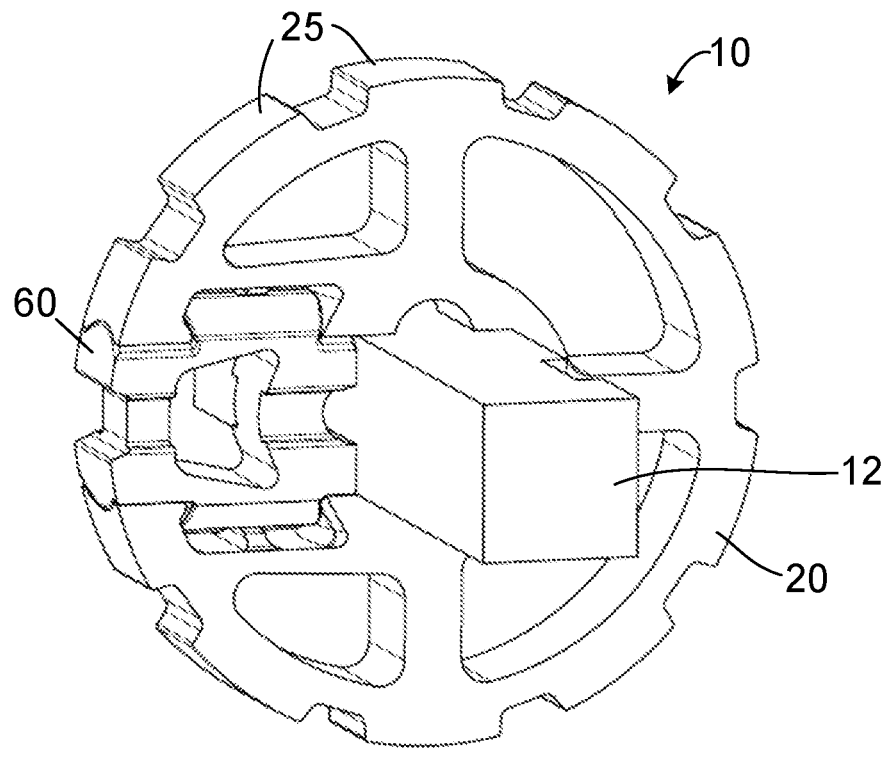
FIG. 2 is an isometric view of the split sprocket of FIG. 1 mounted to a shaft.
Figure 3:
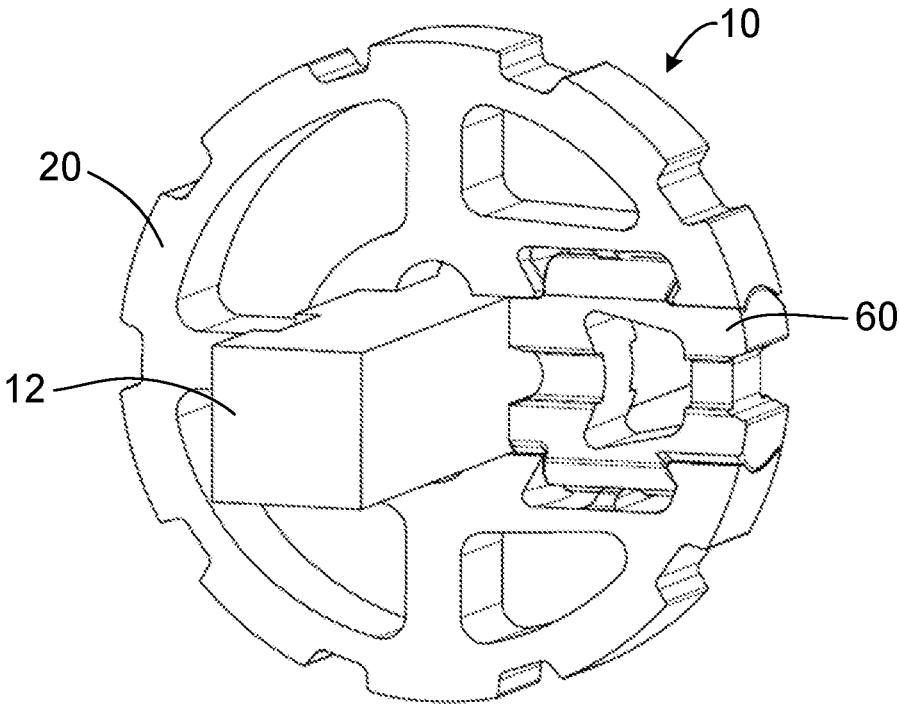
FIG. 3 is another view of the assembled split sprocket of FIG. 2 mounted to the shaft.

One version of a split sprocket embodying features of the invention is shown in FIGS. 1-3. The illustrative split sprocket 10 comprises two sections: a first section, shown as a base portion 20, and a second section, shown as a cap portion 60. The cap portion 60 mates with the base portion 20 to form a sprocket having peripheral drive elements, shown as teeth 25, for engaging drive structure on a conveyor chain or belt. The illustrative teeth are spaced equally around the circumference of the periphery at a constant pitch. However, the invention is not limited to the illustrative drive element configuration, and the drive structure may have any suitable size, shape, pitch and configuration suitable for engaging a conveyor belt or chain. In the illustrative embodiment, the base portion and the cap portion are joined together in a puzzle pattern to form the complete sprocket, though any suitable connection means may be used to join together the two sections.

Each section 20, 60 may comprise a single unitary piece or multiple subpieces coupled together. In this example, the two sections are shaped differently, with the first section 20 being the larger section. The illustrative base portion 20 is curved and spans the majority of the circumference of the sprocket except for a space in the periphery, with the cap portion 60 inserted in the space and completing the circumference when mated to the base portion 60.

The sprocket 10 includes a collar or central hub 30 defining a central opening 29 for receiving a shaft 12, as shown in FIGS. 2 and 3.

Figure 4:
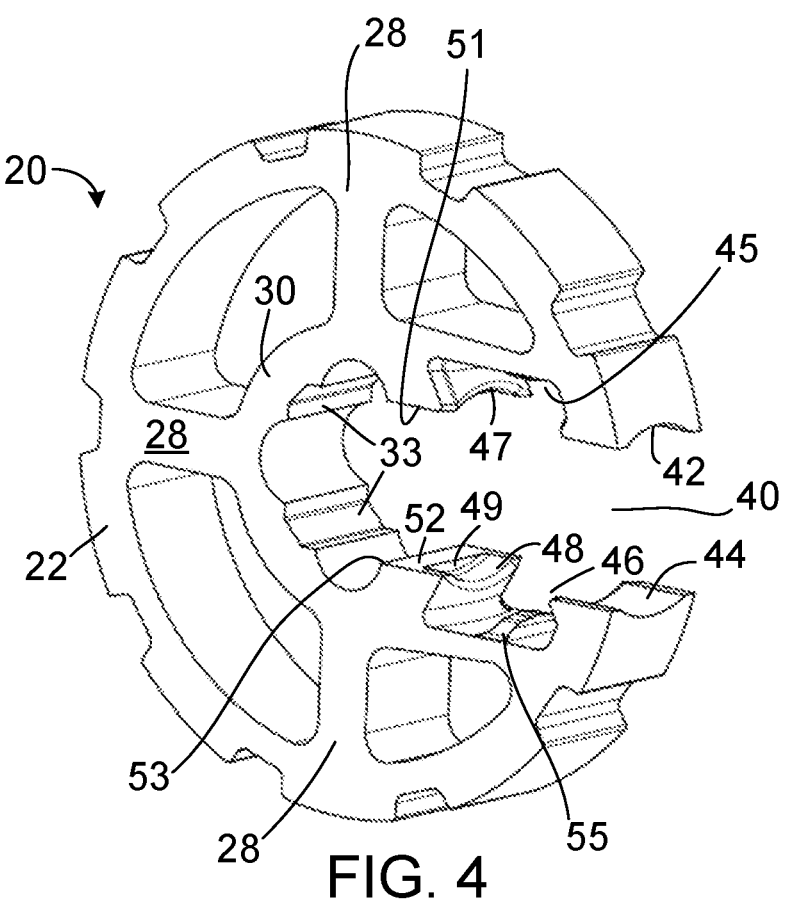
FIG. 4 is an isometric view of the base portion of the split sprocket of FIG. 1.
Figure 5:
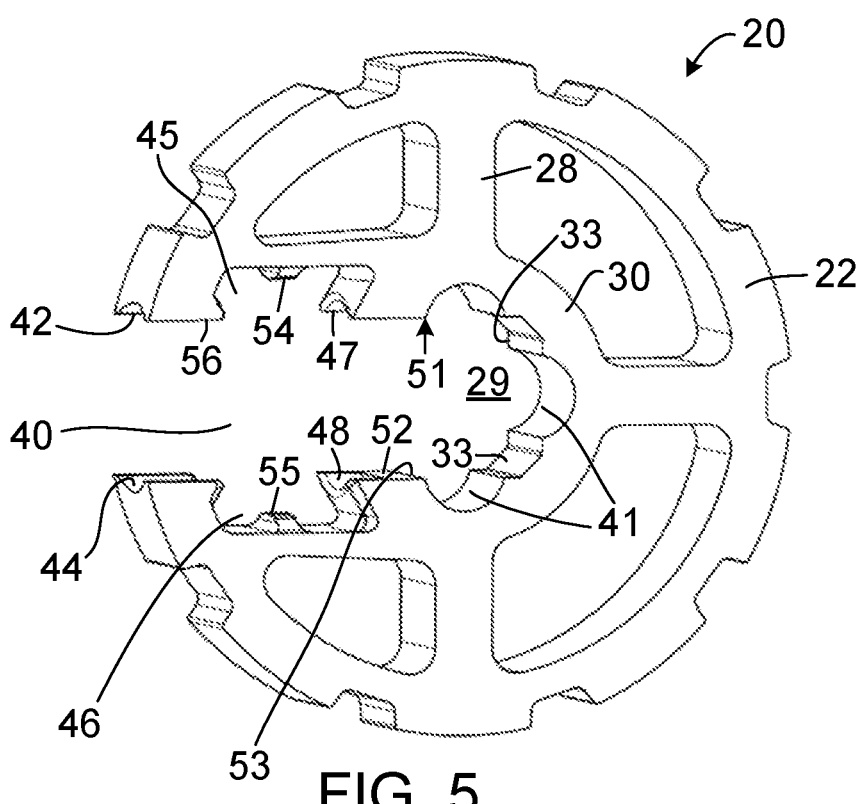
FIG. 5 is a front view of the base portion of the split sprocket of FIG. 1.

Referring to FIGS. 4 and 5, which show the base portion 20 alone, in the illustrative embodiment, a hub portion 30 is formed within the base portion 20 and connected to a curved peripheral portion 22 of the base portion 20 by a spokes 28, though any suitable means, such as webbing, for connecting the central hub portion 30 to the peripheral portion 22 may be used.

The illustrative hub is designed to engage a shaft 12 and includes bearing surfaces 33 for engaging the shaft. The shaft 12 may include recesses configured to engage the bearing surfaces 33 while preventing migration of the sprocket along the shaft. The hub 30 further includes cleaning recesses 41 on an inner surface thereof for allowing space between the shaft 12 and hub 30 to promote cleanliness and facilitate cleaning.

A shaped passageway 40 extends from a peripheral space in the rim 22 to the hub 30 and receives and locks the cap portion 60. The cap portion 60 is configured to be inserted into the shaped passageway 40 while in a first orientation, then rotate into a locked position, as described below. Prior to inserting the cap portion 60, the shaft 12 is inserted into the central opening 29 via the shaped passageway. The shaped passageway 40 is configured and sized to allow the shaft 12 to pass therethrough.

The shaped passageway 40 includes first and second curved, concave surfaces 42, 44 that oppose each other and extend inwards from the periphery 22. Opposing recesses 45, 46 extend tangentially in a central portion of the shaped passageway for receiving plugs in the cap portion. Third and fourth curved, concave surfaces 47, 48 oppose each other and extend parallel to the first and second curved, concave surfaces 42, 44, respectively. The third and fourth curved, concave surfaces 47, 48 terminate in semicircular end walls 49. Opposing flat surfaces 51, 52 form the inner portion of the shaped passageway and intersect the central opening 29 at inner edges 53.

The opposing recesses 45, 46 include locking bumps 54, 55 in end surfaces. The illustrative side surfaces of the recesses 45, 46 are angled, with a radially-inwards facing tapering barb 56 at the intersection between each concave surface 42, 44 and respective recess 45, 46.

Figures 6, 7, 8:
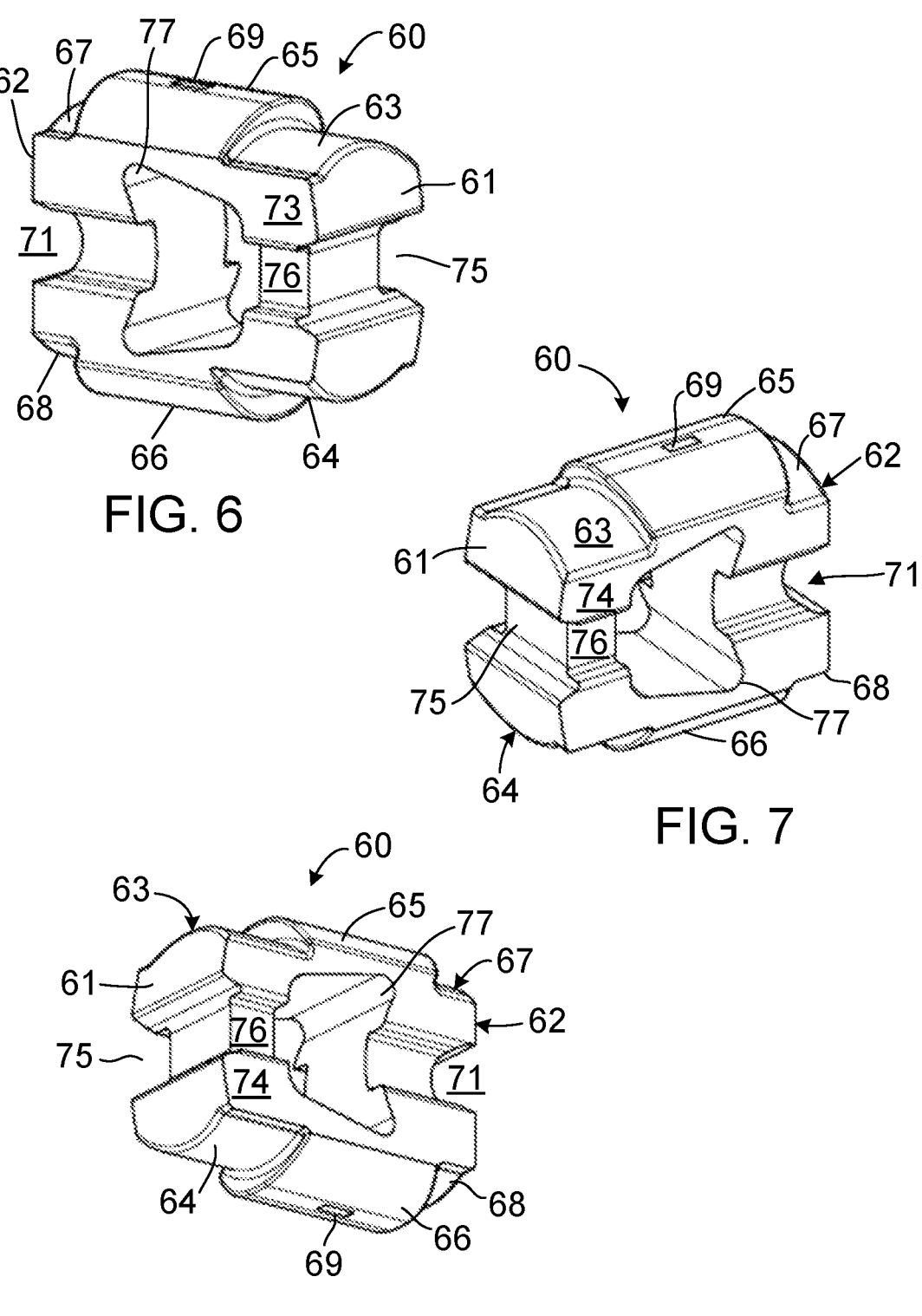
FIG. 6 is an isometric view of the cap portion of the split sprocket of FIG. 1.
FIG. 7 is another view of the cap portion of FIG. 5.
FIG. 8 is a bottom view of the cap portion of FIG. 5.

FIGS. 6-8 show the cap portion 60 in detail. The illustrative cap portion 60 comprises a shaped body extending from a peripheral end 61 configured to complete the periphery of the sprocket 10 to an inner end 62 configured to complete the central opening 29. The peripheral end 61 includes a gullet 75 to complete the pattern of teeth 25.

First and second convex, curved outer surfaces 63, 64 extend from the peripheral end 61 and are configured to interface with the first and second curved, concave surfaces 42, 44 of the base portion 20. The central portion of the cap portion includes projections 65, 66 configured to be received in the recesses 45, 46 of the shaped passageway 40 in the base portion 20. The projections 65, 66 have curved outer surfaces and flat, arcuate side surfaces, but the invention is not so limited. The cap portion 60 includes third and fourth convex, curved outer surface 67, 68 between the projections and inner end 62 configured to be interface with the third and fourth curved, concave surfaces 47, 48 of the base portion 20.

The apexes of the projections 65, 66 each include an indent 69 configured to receive a locking bump 54 or 55.

The illustrative inner end 62 of the cap portion 60 includes a cleaning recess 71 that matches the pattern of cleaning recesses on the base portion 20, but the invention is not so limited.

The cap portion 60 further includes flat side surfaces 73, 74. Grooves 76 continuous with the gullet 75 extend.

The illustrative cap portion 60 includes a tangentially widening opening 77, but the invention is not so limited.

Figure 9:
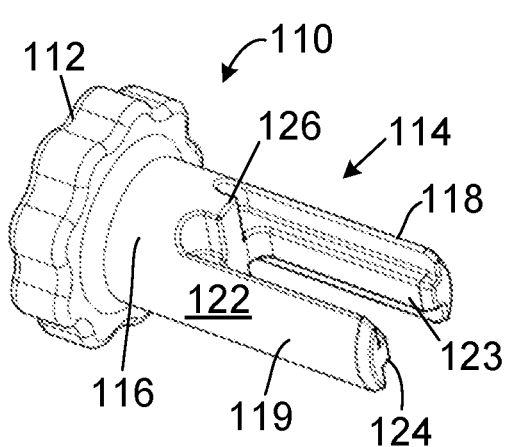
FIG. 9 is an isometric view of a tool used to insert a cap portion into the base portion for the split sprocket of FIG. 1.
Figure 10:
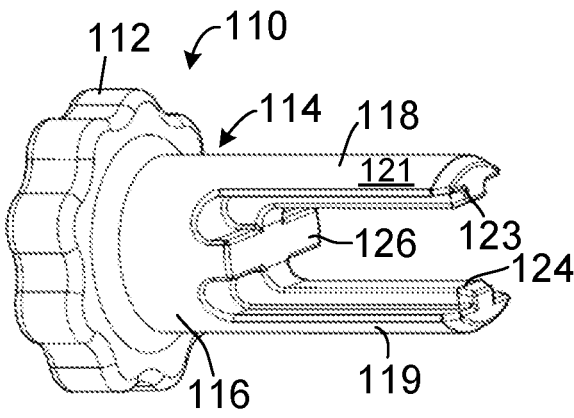
FIG. 10 is a side view of the tool of FIG. 9.

FIGS. 9-10 show a tool 110 configured to insert and lock the cap portion 60 within the shaped passageway 40 of the base portion 20 to form a complete sprocket 10. The illustrative tool 110 includes a handle 112 and a seating portion 114 extending from the handle 112. The seating portion 114 includes a base 116 and a pair of spaced-apart parallel legs 118, 119 for holding the cap portion 60 therebetween.

The legs 118, 119 include curved, convex outer portions 121, 122 configured to slide through the curved, concave surfaces 42, 44, 47, 48 of the shaped passageway 40. The inner surfaces of the legs 118, 119 include projections 123, 124 configured to engage the grooves 76 in the side walls of the cap portion 60. A base projection 126 extends parallel to the inner projections 121, 122 for engaging the gullet 75 on the peripheral end of the cap portion 60.

Figure 11:
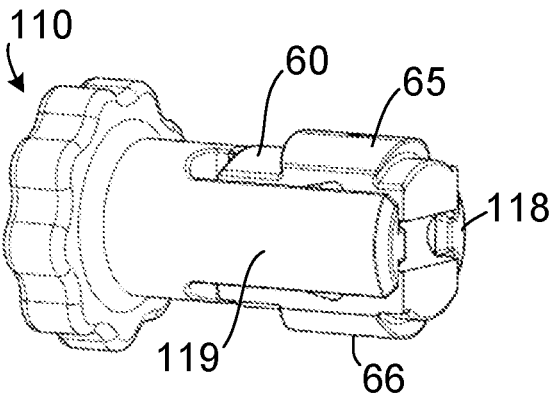
FIG. 11 shows the tool of FIG. 9 with a cap portion for a split sprocket inserted therein.
Figure 13:
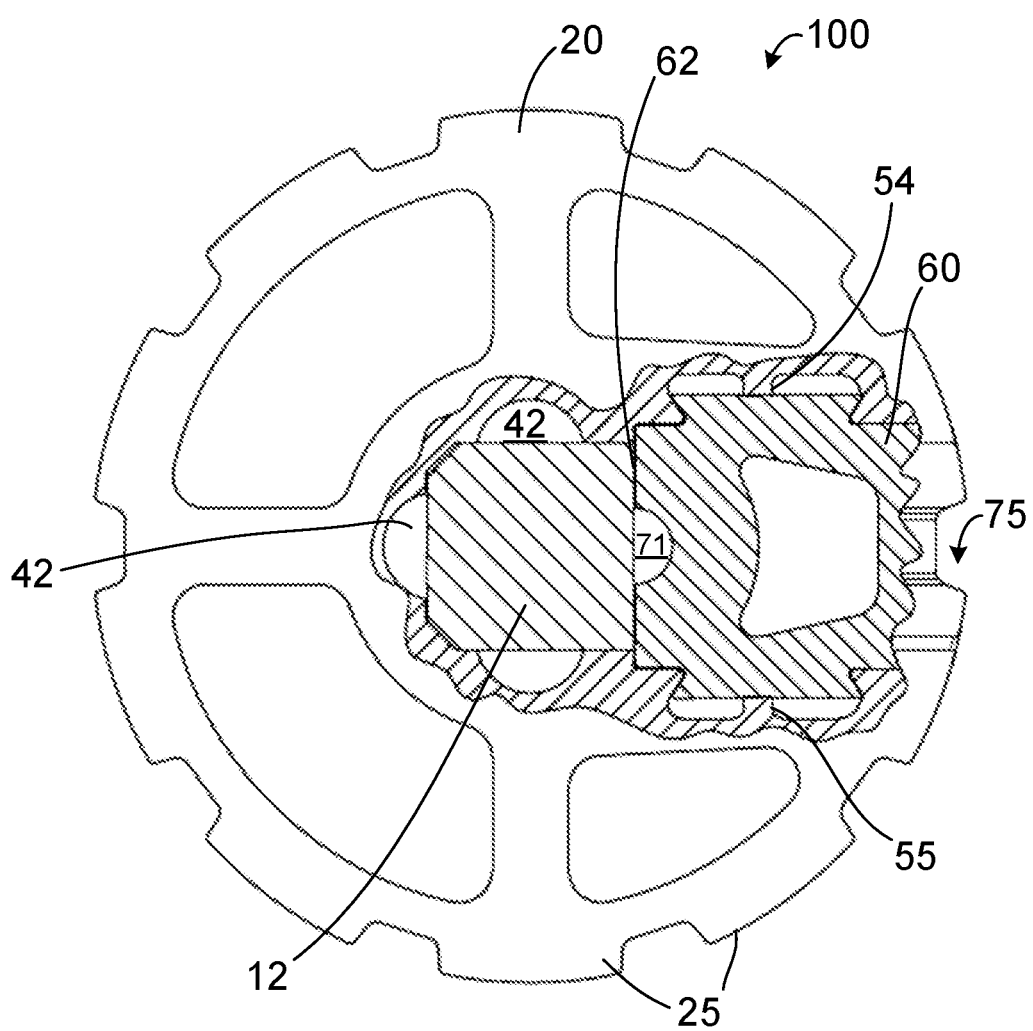
FIG. 13 is a partial cross-sectional front view of the split sprocket of FIG. 1.

As shown in FIG. 11, the cap portion 60 may be mounted within the seating portion 114, with the legs 118, 119 clamping the flat side surfaces 73, 74 and the shaped projections 65, 66 extending from the seating portion 114.

FIGS. 12A-12G show a process of assembling the sprocket 10 on a shaft 12. First, as shown in FIG. 12A, the shaft 12 is inserted through the shaped passageway 40. The illustrative shaft 12 includes notches 13, shown as 45-degree chamfers, in a sprocket-mounting region, which are configured to interface with bearing surfaces 33, also extending at a 45-degree angle, in the central opening 29. The notches 13 constrain the sprocket relative to the shaft.

After the shaft 12 is seated in the central opening 29, as shown in FIG. 12B, the cap portion 60 may be mounted in the tool 110. Alternatively, the cap portion 60 may be mounted in the tool 110 prior to insertion of the shaft 12 into the base portion 20.

To insert the cap portion 60, the tool 110 and cap portion 60 are oriented in a first orientation, shown in FIG. 12C, to allow sliding of the legs 118, 119 through the shaped passageway 40. In the first orientation, the cap portion 60 is offset 90' from the assembled orientation shown in FIG. 1.

After sliding the tool 110 and oriented cap portion 60 through the shaped passageway 40, as shown in FIG. 12D, the tool 110 is rotated, as shown in FIGS. 12E and 12F to place the cap portion 60 in the final orientation and locking the cap portion 60 to the base portion 20 to form a complete sprocket 10. The tool and cap portion 60 are rotated about an axis perpendicular to the major axis of the shaft. Then, as shown in FIG. 12G, the tool 110 can be removed, leaving the complete sprocket 10 mounted on the shaft, as shown in FIG. 12G.

In the locked position, as shown in FIGS. 13-17, the locking bumps 54, 55 engage the indents 69 of the cap portion 60, the shaped projections 65, 66 are seated in recesses 45, 46, the inner end 62 of the cap portion 60 bears against the shaft 12, with recess 71 forming a cleaning recess like cleaning recesses 41 in the base portion 20. The peripheral end 61 of the cap portion completes the pattern of teeth 25 with gullet 75 matching the spaces between the teeth in the base portion 20.

Figure 14:
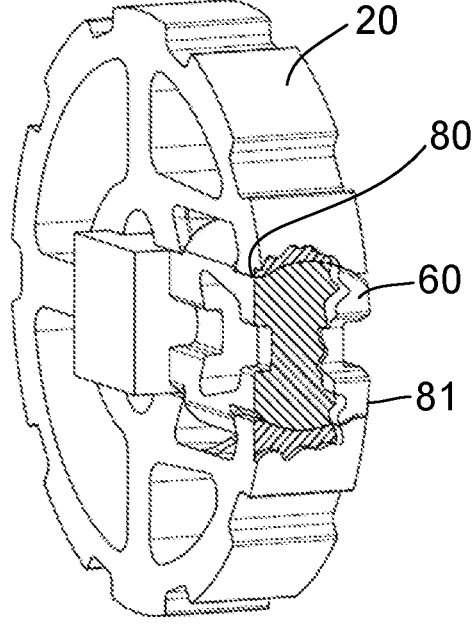
FIG. 14 is a partial cross-sectional isometric view of the split sprocket of FIG. 1.
Figure 15:
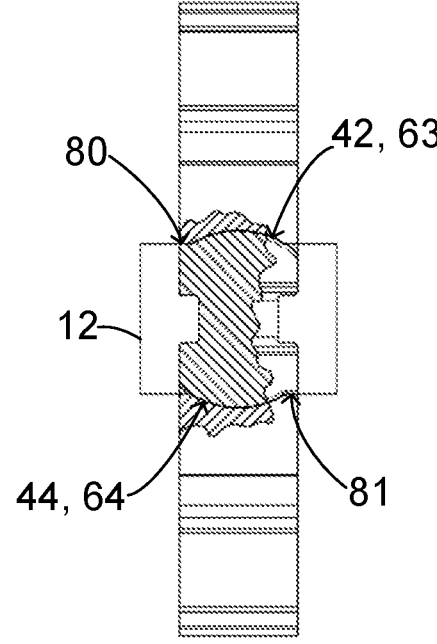
FIG. 15 is a partial cross-sectional side view of the split sprocket of FIG. 1.

As shown in FIGS. 14 and 15, the first and second curved, concave surfaces 42, 44 and first and second convex outer surfaces 63, 64 may form end stop faces 80, 81 (formed by flat surfaces) to provide sideways containment of the cap portion 60 relative to the base portion 20.

Figure 16:
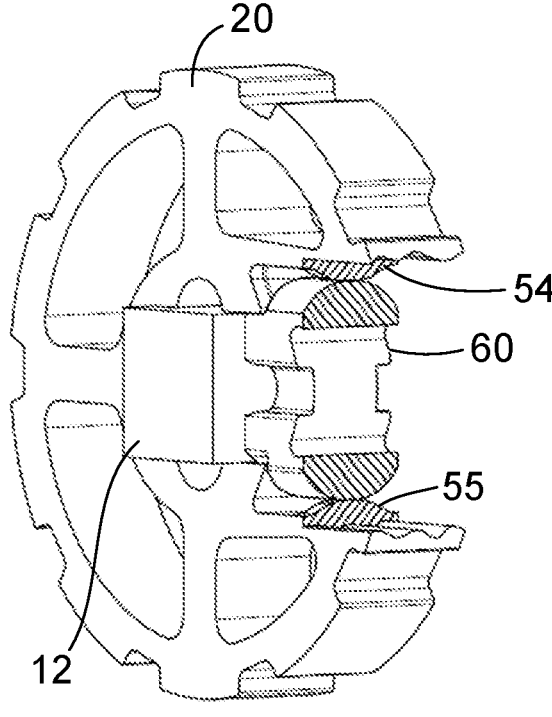
FIG. 16 is a partial cut-away isometric view of the split sprocket of FIG. 1.
Figure 17:
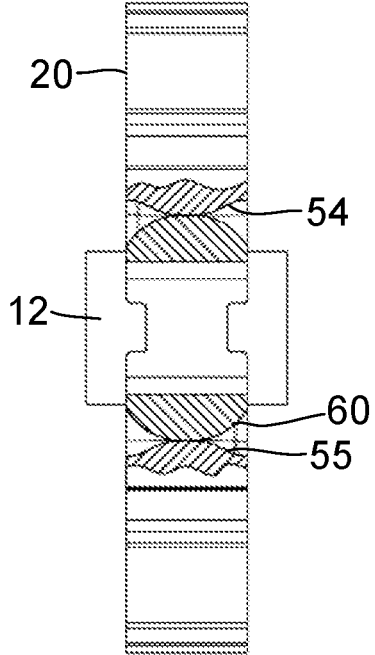
FIG. 17 is a partial cut-away side view of the split sprocket of FIG. 1.
Figure 18:
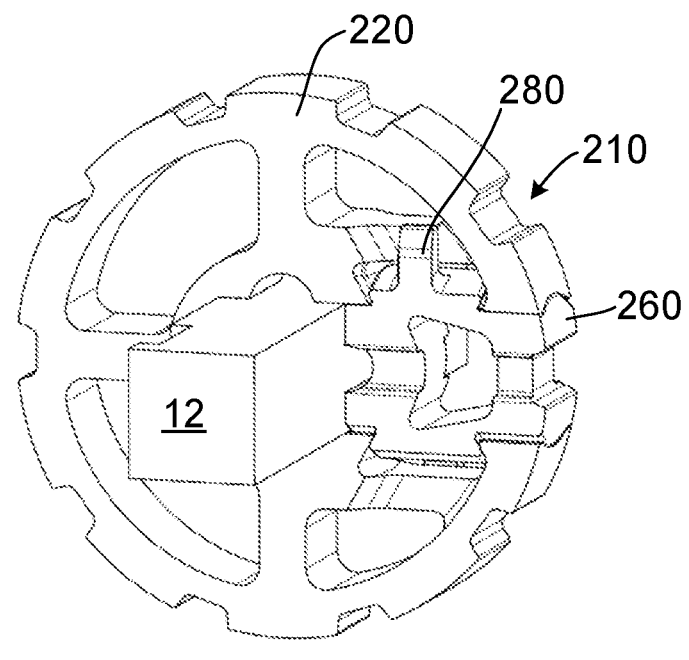
FIG. 18 is an isometric view of an assembled split sprocket mounted on a shaft according to another embodiment of the invention.
Figure 19:
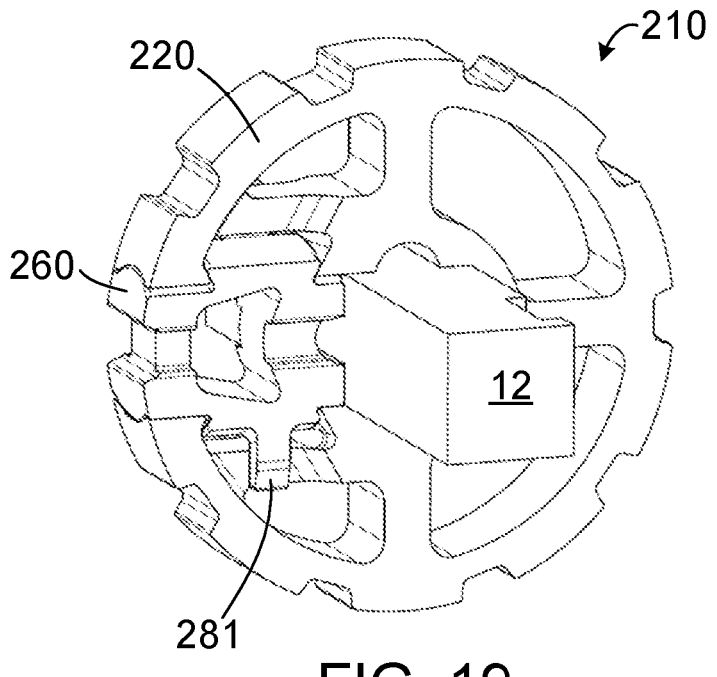
FIG. 19 is another view of the assembled split sprocket mounted on a shaft of FIG. 18.
Figure 20:
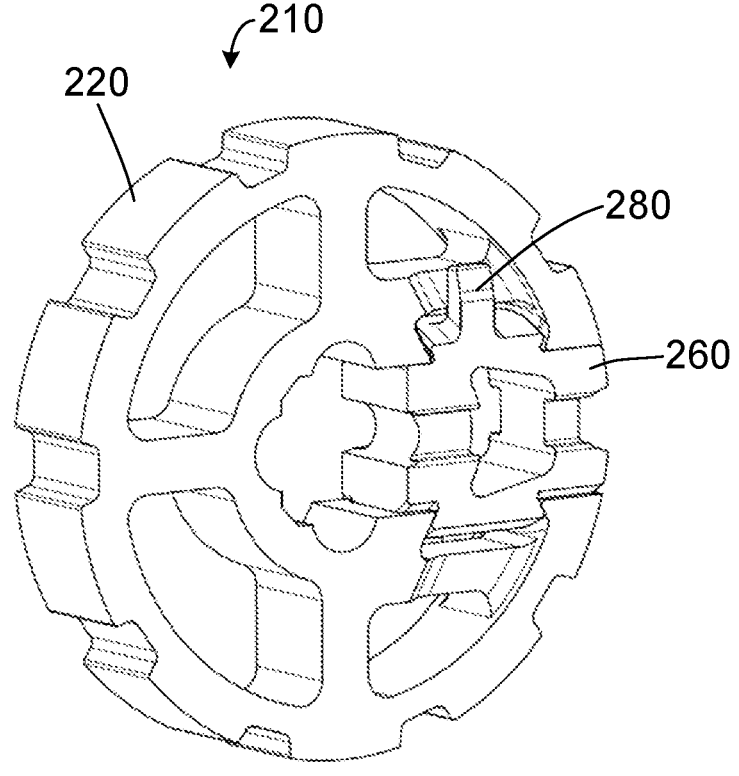
FIG. 20 is an isometric view of the assembled split sprocket of FIG. 18.
Figure 21:
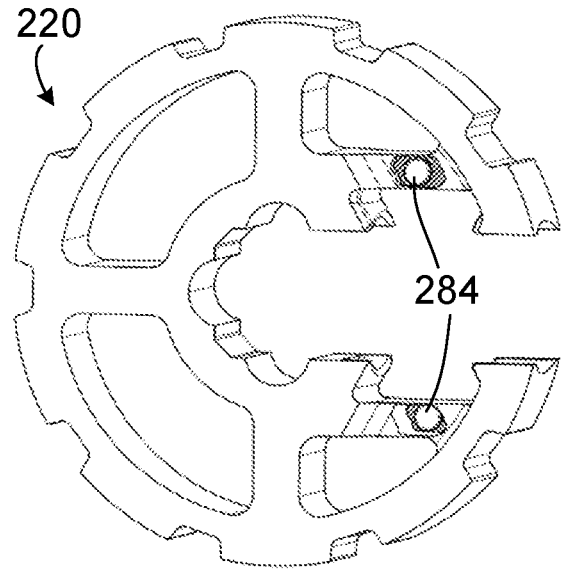
FIG. 21 is an isometric view of a base portion of the assembled split sprocket of FIG. 20.
Figure 22:
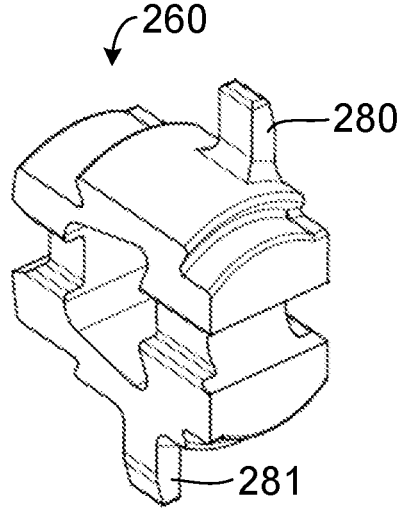
FIG. 22 is an isometric view of a cap portion of the assembled split sprocket of FIG. 21.
Figure 23:
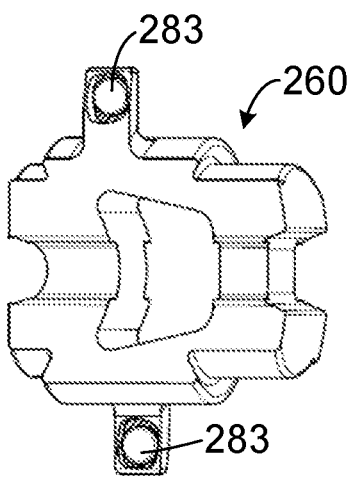
FIG. 23 is an isometric view of the cap portion of FIG. 22.
Figure 24:
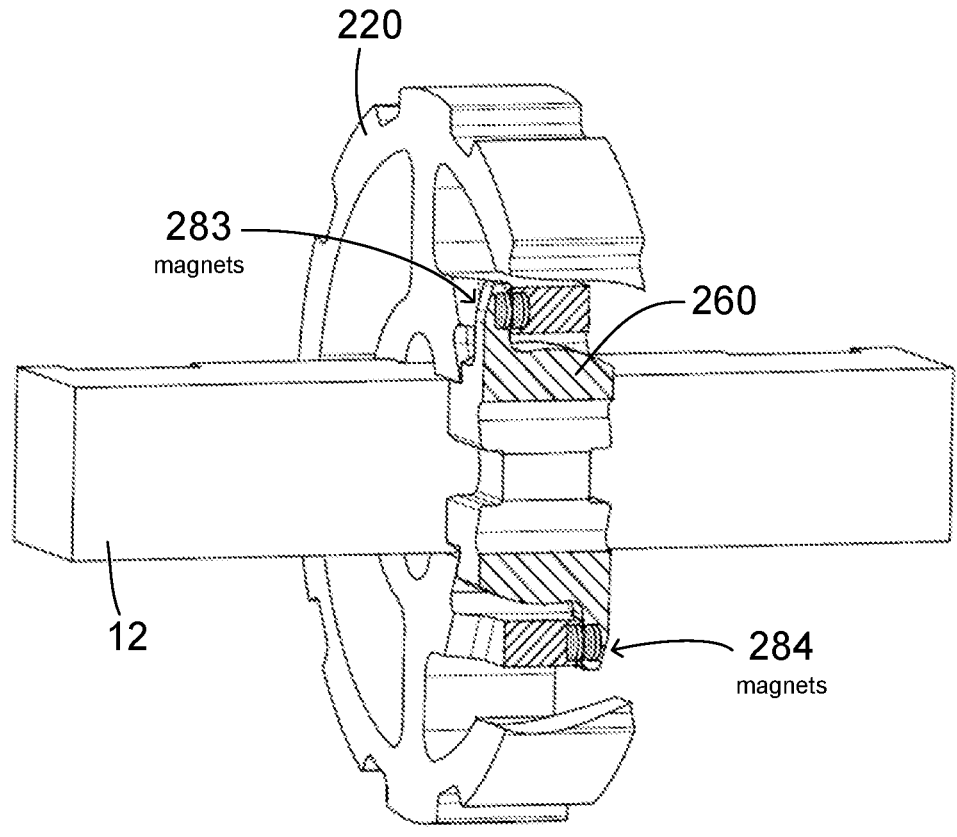
FIG. 24 is a partial cut-away isometric view of the assembled split sprocket and shaft of FIG. 18.

FIGS. 16 and 17 show in detail the interface between the locking bumps 54, 55 and the locking indent 69 when the cap portion 60 is locked to the base portion 20.

In another embodiment, shown in FIGS. 18-24, magnets may be used to secure the connection between a base portion 220 and a cap portion 260 of a split sprocket 210. The split sprocket 210 includes latching arms 280 configured to be received in seats in the body portion 220. A first latching arm 280 extends tangentially along a first axial end of the cap portion 260 and a second latching arm 281 is diagonally opposite the first latching arm, extending along a second axial end of the cap portion in an opposite direction. The base portion 220 and cap portion 260 may be otherwise similar to the base portion 20 and cap portion 60 of the sprocket 10.

The latching arms 280 may include embedded magnets 283 that latch with embedded magnets 284 in the seats of the body portion 284.

The sprocket 210 may be assembled on a shaft 12 in the same or similar manner as the sprocket 10 is assembled: by inserting the cap portion 260 through a shaped passageway of the body portion 220 while in a first orientation, then rotating the cap portion 260 into a locked position. A tool, such as the tool 110 described above may be used to insert and rotate the cap portion 260. As the cap portion 260 rotates about an axis perpendicular to the main axis of the shaft within the shaped passageway, the magnets 283, 284 attract each other to latch the cap portion 260 and base portion 220 together.

Figure 25:
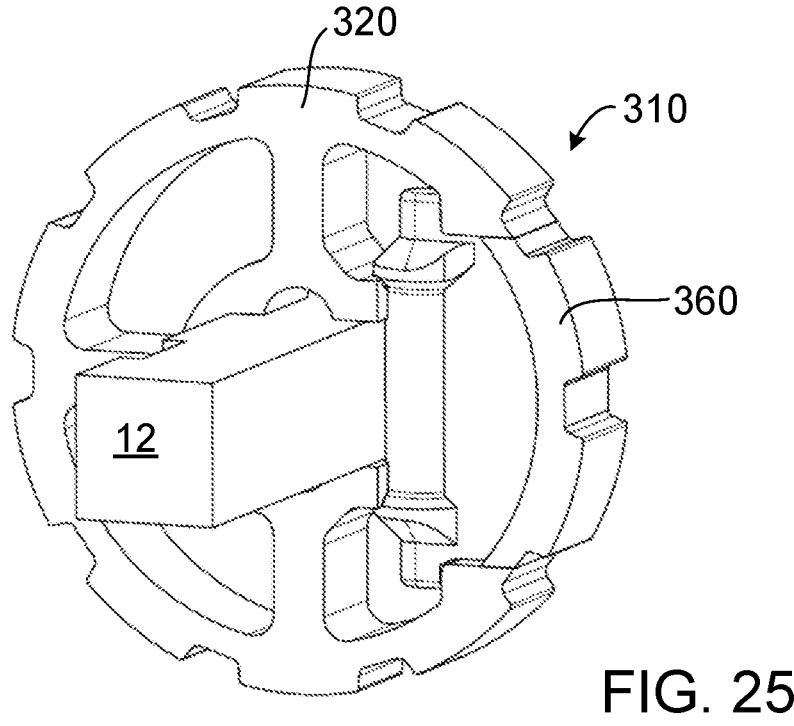
FIG. 25 is an isometric view of an assembled split sprocket mounted on a shaft according to another embodiment.
Figure 26:
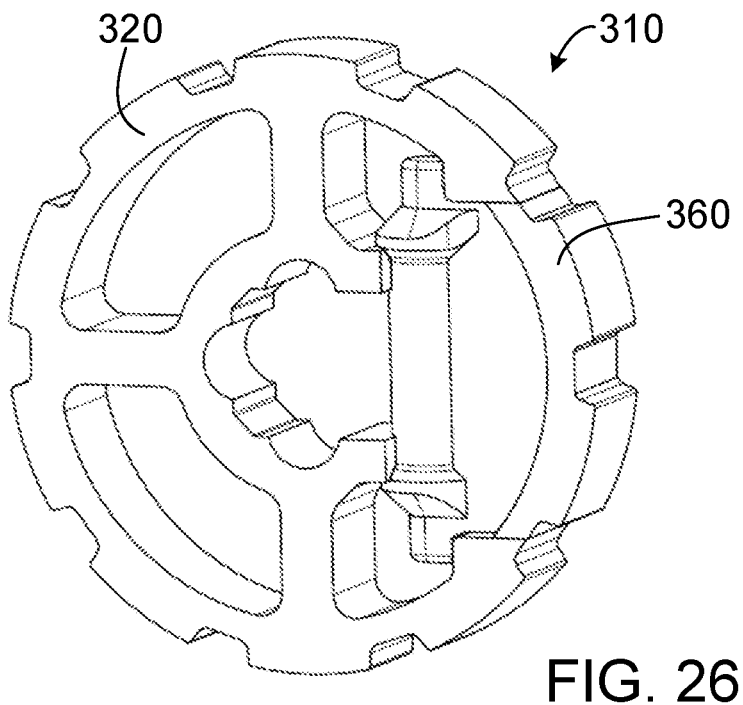
FIG. 26 is an isometric view of the assembled split sprocket of FIG. 25.

In still another embodiment, shown in FIGS. 25 and 26 a split sprocket 310 comprises a body portion 320 and a pivoting cap portion 320 that mates with the base portion 320 to form a complete sprocket. The pivoting cap portion 320 may be inserted into a space formed in the base portion 320 in a first orientation, then pivot into a locked, engaged position to form the complete sprocket 310. The illustrative cap portion 320 is pivoted about an axis perpendicular to the major axis of the shaft.

Figure 27:
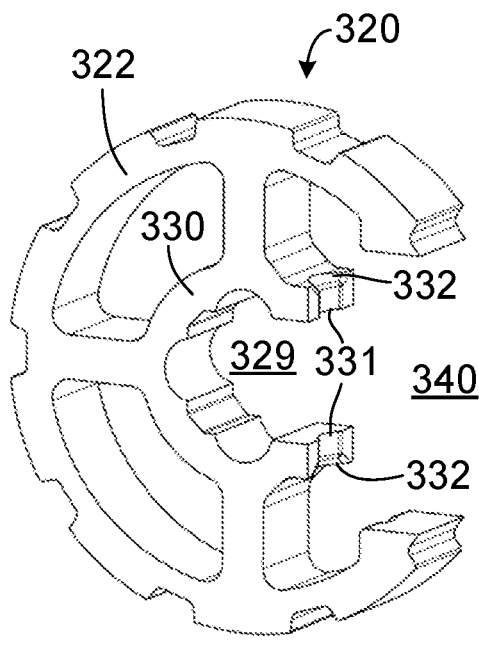
FIG. 27 is an isometric view of the base portion of the split sprocket of FIG. 26.
Figure 28:
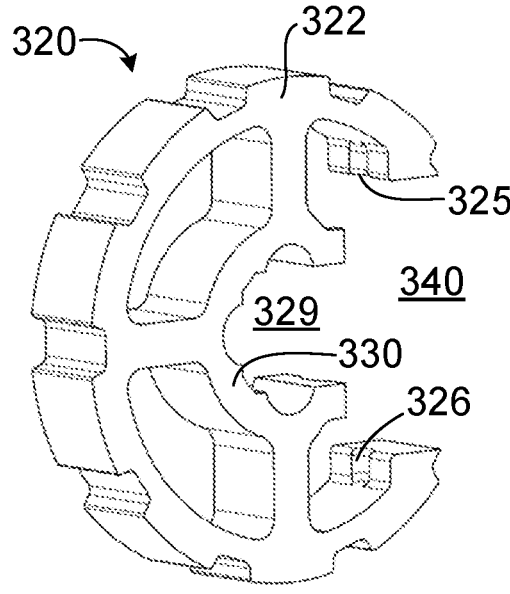
FIG. 28 is another view of the base portion of FIG. 27.

As shown in FIGS. 27 and 28, the illustrative base portion 320 comprises a hub portion 330 forming an opening 329 for mounting the shaft 12, as described above, and a curved peripheral portion 322 that engages a conveyor belt. Spokes 328 or other connects, connect the hub portion 330 to the peripheral portion 322.

The base portion forms a space 340 extending from the central opening 329 to the periphery for seating the cap portion 320. Radially outward-facing recesses 331 in the hub 330 seat an inner end of the cap portion 360. Containment chamfers 332 are formed around the recesses 331. The base portion 320 further includes radially inward-facing locking indents 325, 326 in the peripheral portion.

Figure 29:
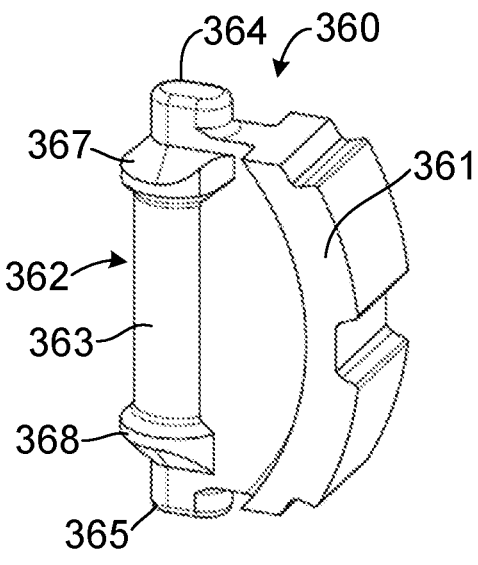
FIG. 29 is an isometric view of the cap portion of the split sprocket of FIG. 26.
Figure 30:
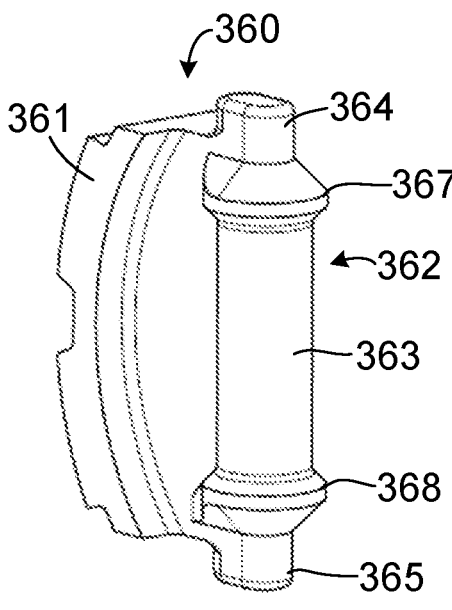
FIG. 30 is another view of the cap portion of FIG. 29.

The cap portion 360, shown in FIGS. 29 and 30, comprises a curved outer peripheral portion 361 including drive teeth structure matching a pattern of drive teeth on the base portion periphery 322. An inner end 362 of the cap portion 320 includes a stem 363 configured to be received in the recesses 331. The stem 363 includes enlarged shoulders 367, 368 at each end configured to interface with the containment chamfers 332. A mounting nub 364, 365 extend from each enlarged shoulder 367, 368. Each mounting nub 364, 365 is configured to engage a locking indent 325, 326. As shown, the mounting nubs 364, 365 having rounded ends, a flat outer wall and flat side walls.

FIGS. 31A-31E show the process on mounting the sprocket 310 on a shaft according to an embodiment. As shown in FIG. 31A, first, a shaft 12 passes through the space 340 in the body portion 320 and into the mounting opening 329. Then, the cap portion 360, rotated 90° about the mounting nubs 364, 365 is inserted into the space 340 along an axial direction, as shown in FIG. 31B. The cap portion 360 passes into the space 340 until the stem 363 can be seated in the recesses 331 and the mounting nubs 364, 365 oppose the locking indents 325, 326, as shown in FIG. 31C. As shown in FIG. 31D, the cap portion 360 then pivots about the stem 363 until the curved outer ends of the mounting tabs are inserted into and contained by the locking indents 326, 326, as shown in FIG. 31E.

Figure 32:
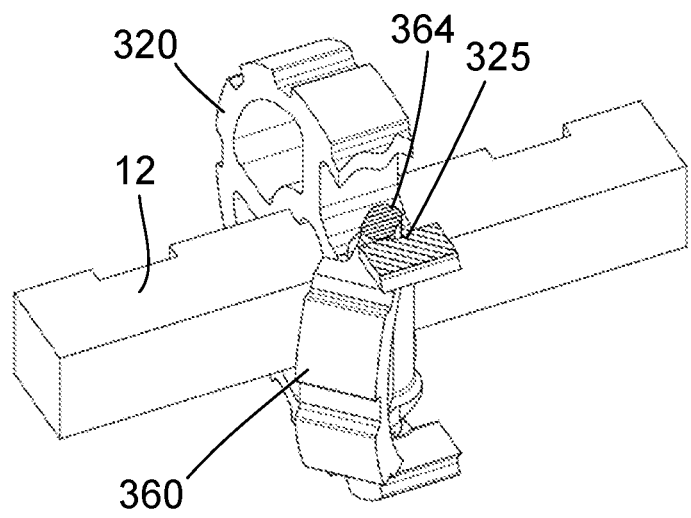
FIG. 32 is a partial cut-away view of the split sprocket of FIG. 26 during assembly on a shaft.
Figure 33:
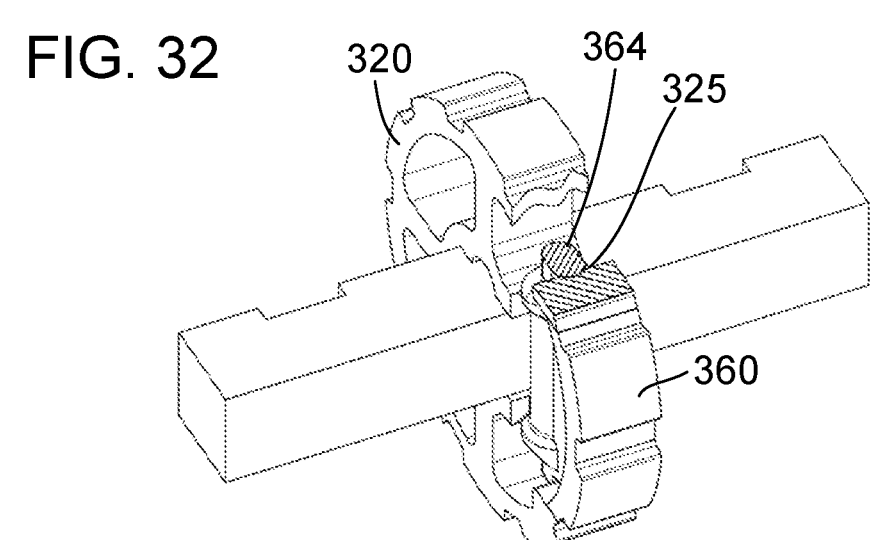
FIG. 33 is a partial cut-away view of the split sprocket of FIG. 26 while assembled on a shaft.

FIG. 32 is a partially cut-away view of the sprocket 310 during pivoting of the cap portion into the locked position. FIG. 33 is a partially cut-away view of the sprocket after locking the cap portion relative to the base portion 320, in which the mounting nubs 364, 364 are seated in the latching recesses 325, 326.

Figure 34:
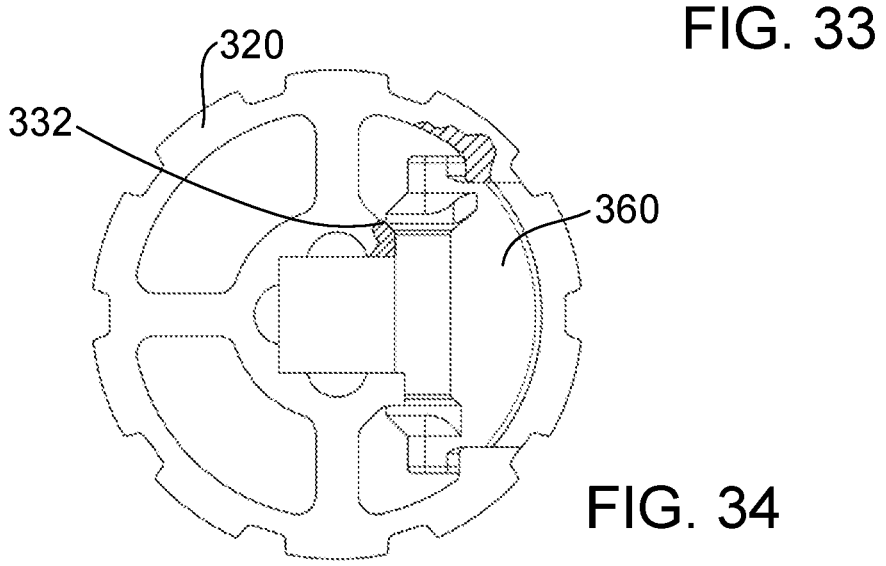
FIG. 34 is a partial cut-away front view of the split sprocket of FIG. 26.

As shown in FIG. 34, in the locked position, the containment chamfers 332 about and contain chamfers on the enlarged shoulders to retain the inner end 362 of the cap portion 260 relative to the base portion.

Although the invention has been described in reference to a version of a split sprocket, other versions are possible. For example, the periphery does not have to be toothed; it could be smooth like a roller, or grooved like a pulley. So, the term sprocket as used in the claims is meant to encompass split wheels with or without teeth on their peripheries.

What is claimed is:

1. A sprocket for a conveyor belt comprising:
a first sprocket section having
a curved peripheral portion defining driving elements;
a hub radially inward of the peripheral portion for receiving a shaft; and
a shaped passageway extending from a space in the curved peripheral portion to the hub,
wherein the shaped passageway comprises
a first curved, concave surface extending inwards from the curved peripheral portion;
a second curved, concave surface opposing the first curved, concave surface extending inwards from the curved peripheral portion;
a first recess extending tangentially in a central portion of the shaped passageway;
a second recess opposing the first recess and extending tangentially in the central portion of the shaped passageway;
a third curved, concave surface inwards of the first recess parallel to the first curved, concave surface; and
a fourth curved, concave surface opposing the third curved, concave surface and parallel to the second curved, concave surface; and
a second sprocket section inserted in the shaped passageway to complete the peripheral portion and hub,
wherein the second sprocket section is configured to be inserted in the shaped passageway in a first orientation, then rotated to a locked position completing the peripheral portion and hub.

2. The sprocket of claim 1, wherein the first sprocket section further comprises spokes connecting the hub to the peripheral portion.

3. The sprocket of claim 1, wherein the third and fourth curved, concave surface terminate in semicircular end walls.

4. The sprocket of claim 3, further comprising opposing flat surfaces inwards of the semicircular end walls forming an inner portion of the shaped passageway.

5. The sprocket of claim 1, wherein the second sprocket section comprises a shaped body extending from a peripheral end to an inner end, wherein the peripheral end includes a gullet to complete a pattern of drive elements.

6. The sprocket of claim 5, wherein the shaped body includes first and second convex, curved outer surfaces extending inwards from the peripheral end for interfacing with the first and second curved, concave surfaces.

7. The sprocket of claimed 6, wherein the shaped body further includes projections having curved outer surfaces and arcuate flat surfaces extending tangentially and configured to be received in the first and second recesses of the shaped passageway.

8. The sprocket of claim 7, wherein at least one projection of the second sprocket section shaped body includes an indent at an apex and at least one recess of the first sprocket section includes a locking bump configured to be received in the indent.

9. The sprocket of claim 7, wherein the shaped body further includes third and fourth convex, curved outer surfaces extending inwards from the projections for interfacing with the third and fourth curved, concave surfaces.

10. The sprocket of claim 5, wherein the shaped body includes flat side surfaces and grooves continuous with the gullet extending through each flat side surface from the peripheral end to the inner end.

11. The sprocket of claim 7, further comprising a latching arm extending from each projection, and seats in the first sprocket section for receiving the latching arms.

12. The sprocket of claim 11, further comprising magnets in the latching arms and seats for latching the first sprocket section and the second sprocket section together.

13. A sprocket assembly, comprising:
a shaft extending along a longitudinal axis and including notches in a mounting region;
a sprocket mounted on the shaft in the mounting region, the sprocket comprising,
a first sprocket section having a curved peripheral portion defining driving elements, a hub radially inward of the peripheral portion for receiving the shaft and including bearing surfaces that interface with the notches and a shaped passageway extending from a space in the curved peripheral portion to the hub;
a second sprocket section inserted in the shaped passageway to complete the peripheral portion and hub, and
a tool for inserting the second sprocket section in the shaped passageway in a first orientation and rotating the second sprocket section to a locked position completing the peripheral portion and hub, wherein the tool comprises a handle and a seating portion comprising a base and spaced apart legs for holding the second sprocket section.

14. A section of a sprocket for a conveyor belt comprising:
a curved peripheral portion defining driving elements;
a hub radially inward of the peripheral portion for receiving a shaft; and
a shaped passageway extending from a space in the curved peripheral portion to the hub, wherein the shaped passageway comprises
a first curved, concave surface extending inwards from the curved peripheral portion;

a second curved, concave surface opposing the first curved, concave surface extending inwards from the curved peripheral portion;

a first recess extending tangentially in a central portion of the shaped passageway;

a second recess opposing the first recess and extending tangentially in the central portion of the shaped passageway;

a third curved, concave surface inwards of the first recess parallel to the first curved, concave surface; and a fourth curved, concave surface opposing the third curved, concave surface and parallel to the second curved, concave surface.

15. The sprocket of claim 14, wherein the third and fourth curved, concave surface terminate in semicircular end walls.

16. The sprocket of claim 15, further comprising opposing flat surfaces inwards of the semicircular end walls forming an inner portion of the shaped passageway.

* * * * *